United States Patent [19]
Kyrtsos et al.

[11] Patent Number: 5,452,211
[45] Date of Patent: Sep. 19, 1995

| [54] | METHOD AND SYSTEM FOR DETERMINING VEHICLE POSITION |
|---|---|
| [75] | Inventors: Christos T. Kyrtsos, Peoria; Adam J. Gudat, Edelstein, both of Ill. |
| [73] | Assignee: Caterpillar Inc., Peoria, Ill. |
| [21] | Appl. No.: 927,037 |
| [22] | Filed: Aug. 10, 1992 |
| [51] | Int. Cl.$^6$ ............................................. G01C 21/00 |
| [52] | U.S. Cl. .................... 364/449; 364/459; 342/357; 342/457 |
| [58] | Field of Search ............... 364/458, 449, 444, 447, 364/448, 459, 455; 342/357, 450, 451, 457 |

[56]  References Cited

U.S. PATENT DOCUMENTS

| 4,812,991 | 3/1989 | Hatch | 364/458 |
|---|---|---|---|
| 4,894,662 | 1/1990 | Counselman | 342/357 |
| 4,949,268 | 8/1990 | Nishikawa et al. | 364/449 |
| 5,119,101 | 6/1992 | Barnard | 342/357 |
| 5,148,179 | 9/1992 | Allison | 342/357 |
| 5,155,491 | 10/1992 | Ando | 342/357 |
| 5,202,829 | 4/1993 | Geier | 364/449 |
| 5,257,195 | 10/1993 | Hirata | 364/449 |
| 5,265,025 | 11/1993 | Hirata | 364/449 |
| 5,293,318 | 3/1994 | Fukushima | 364/449 |

OTHER PUBLICATIONS

"GPS/PLRS Aided Inertial Land Navigation System Performance" IEEE, Record 86 CH 2365-5, Nov. 4–7, 1986.

Article entitled "NAVSTAR: Global Positioning System—Ten Years Later" by Bradford W. Parkinson and Stephen W. Gilbert published in *Proceedings of the IEEE*, vol. 71, No. 10, Oct. 1983.

*Primary Examiner*—Kevin J. Teska
*Assistant Examiner*—Russell W. Frejd
*Attorney, Agent, or Firm*—James R. Yee

[57]  ABSTRACT

A system and method for estimating the terrestrial position of a vehicle is provided. The system receives electromagnetic signals from a single satellite and responsively produces successive ranges from the satellite to the vehicle and respective successive positions of the satellite. The vehicle's position is determined as a function of the successive ranges and positions.

22 Claims, 14 Drawing Sheets

METHOD AND SYSTEM FOR DETERMINING VEHICLE POSITION

TECHNICAL FIELD

The present invention relates generally to positioning systems which use a constellation of Earth-orbiting satellites, and more particularly, to a positioning system and method for determining the terrestrial position of a vehicle at or near the surface of the Earth using a single satellite.

BACKGROUND ART

Several national governments, including the United States (U.S.), are presently developing a terrestrial position determination system, referred to generically as a global positioning system or GPS. Global positioning systems include a number of satellites placed in orbit around the Earth. The GPS satellites are designed to transmit electromagnetic signals. From these electromagnetic signals, the absolute or terrestrial position, that is, position with respect to the Earth's center, of any GPS receiver at or near the Earth's surface can ultimately be determined.

The U.S. government has designated its global positioning system, NAVSTAR. It is anticipated that the NAVSTAR GPS will be declared operational by the U.S. government in 1993. The NAVSTAR GPS envisions four orbiting GPS satellites in each of six orbits. A total of 24 GPS satellites will be in orbit at any given time with twenty-one (21) GPS satellites in operation and three (3) satellites serving as spares. The six (6) orbits will have mutually orthogonal planes with respect to the Earth. The orbits will be neither polar nor equatorial. Furthermore, the GPS satellites will orbit the Earth approximately every twelve (12) hours.

Using the NAVSTAR GPS, the relative distance or range from the orbiting GPS satellites with respect to any GPS receiver can be determined by the electromagnetic signals. The relative distance from a satellite to the receiver is commonly referred to as a pseudorange.

In the NAVSTAR GPS, electromagnetic signals are continuously transmitted from all of the GPS satellites at a single carrier frequency. However, each of the GPS satellites has a different gold code, thereby allowing for differentiation of the signals. In the NAVSTAR GPS, the carrier frequency is modulated using a pseudorandom signal which is unique to each GPS satellite. Consequently, the orbiting satellites in the NAVSTAR GPS can be identified when the carrier frequencies are demodulated.

Furthermore, the NAVSTAR GPS envisions two modes of modulating the carrier wave signal using pseudorandom number (PRN) signals. In one mode, referred to as the "coarse/acquisition" or "C/A" mode, the PRN signal is a gold code sequence having a chip rate of 1.023 MHz. The gold code sequence is a conventional pseudorandom sequence which is known in the art. A chip is one individual pulse of the pseudorandom code. The chip rate of a pseudorandom code sequence is the rate at which the chips in the sequence are generated. Consequently, the chip rate is equal to the code repetition rate divided by the number of members in the code. Accordingly, with respect to the C/A mode, there exists 1.023 chips in each gold code sequence and the sequence is repeated once every millisecond. Use of the 1.023 MHz gold code sequence from four GPS satellites enables the terrestrial position of an Earth receiver to be determined with an approximate accuracy of 60–300 meters.

The second mode of modulation in the NAVSTAR GPS is commonly referred to as the "precise" or "protected" (P) mode. In the P mode, the pseudorandom code has a chip rate of 10.23 MHz. Moreover, the P mode sequences are extremely long, so that the sequences repeat no more than once every 267 days. As a result, the terrestrial position of any Earth receiver can be determined to within an approximate accuracy of 16–30 meters.

However, the P mode sequences are held in secrecy by the U.S. government and are not made publicly available. In other words, the P mode is intended for use only by Earth receivers authorized by the U.S. government.

For more a detailed discussion on the NAVSTAR GPS, see Parkinson, Bradford W. and Gilbert, Stephen W., "NAVSTAR: Global Positioning System—Ten Years Later," *Proceedings of the IEEE*, Vol. 71, No. 10, October 1983, which is incorporated herein by reference. For a detailed discussion of a vehicle positioning-/navigation system which uses the NAVSTAR GPS, see U.S. patent application Ser. No. 07/628,560, entitled "Vehicle Position Determination System and Method, filed Dec. 3, 1990, which is incorporated herein by reference.

Pseudoranges are determined by measuring the propagation time delays between the time of transmission and the time of reception of the electromagnetic signals. In the NAVSTAR GPS, the electromagnetic signals are encoded continuously with the time at which the signals are transmitted from the GPS satellites. The transmission time can be subtracted from the reception time to determine a time delay. From the calculated time delay, the pseudorange can be accurately derived by multiplying the propagation time delay by the speed of transmission (approximately $2.99792458 \times 10^8$ m/s).

The absolute position of any GPS receiver can be determined using the pseudoranges of at least three GPS satellites via simple geometric theory involving triangulation methods. The accuracy of the terrestrial position estimate is partially dependent upon the number of GPS satellites that are sampled. Using more GPS satellites in the computation can increase the accuracy of the terrestrial position estimate.

Conventionally, four GPS satellites are sampled to determine each terrestrial position estimate because of errors contributed by circuit clock differentials among the GPS receivers and the GPS satellites. Clock differentials may be as large as several milliseconds. Ideally, there are more than four satellites "visible" to the receiver. That is, the receiver is able to receive signals from more than four satellites. When there are more than four satellites visible, the four satellites which will give the most accurate position are used. The GPS receiver may be adapted to select satellites based on its own criteria or the user may conversely select the satellites according to different criteria. The selected satellites are normally referred to as a constellation.

However, there are presently some periods of time when less than four or possibly only one satellite is in view. This may be due to natural or manmade obstacles, for example, a building or a cliff, that block the signals or this may be due to satellite malfunction or selective availability. Selective availability or SA refers to the government's selective shutting down or commanding a satellite to transmit bad data in the C/A mode, for example offsetting the orbit parameters or desynchronizing the satellite clocks. This leaves the P mode still operational to users authorized by the government. Since only government authorized receivers can use the P mode, it is desirable to provide positioning capability using the C/A mode during this period.

The present invention is adapted to overcome one or more of the problems as set forth above.

DISCLOSURE OF THE INVENTION

In one aspect of the present invention, a system for estimating the terrestrial position of a vehicle is provided. The system receives electromagnetic signals from a single satellite and responsively produces ranges from the satellite to the vehicle. The system determines a set of ranges, each range being separated in time and responsively determines the position of the vehicle.

In another aspect of the present invention, a method for estimating the position of a vehicle is provided. The method includes the steps of receiving electromagnetic signals from a single satellite and responsively determining successive positions of the satellite, spaced apart in time. The method also includes the steps of producing successive ranges from each of the successive positions of the source and responsively determining the position of said vehicle.

BEST MODE FOR CARRYING OUT THE INVENTION

Figure 1:
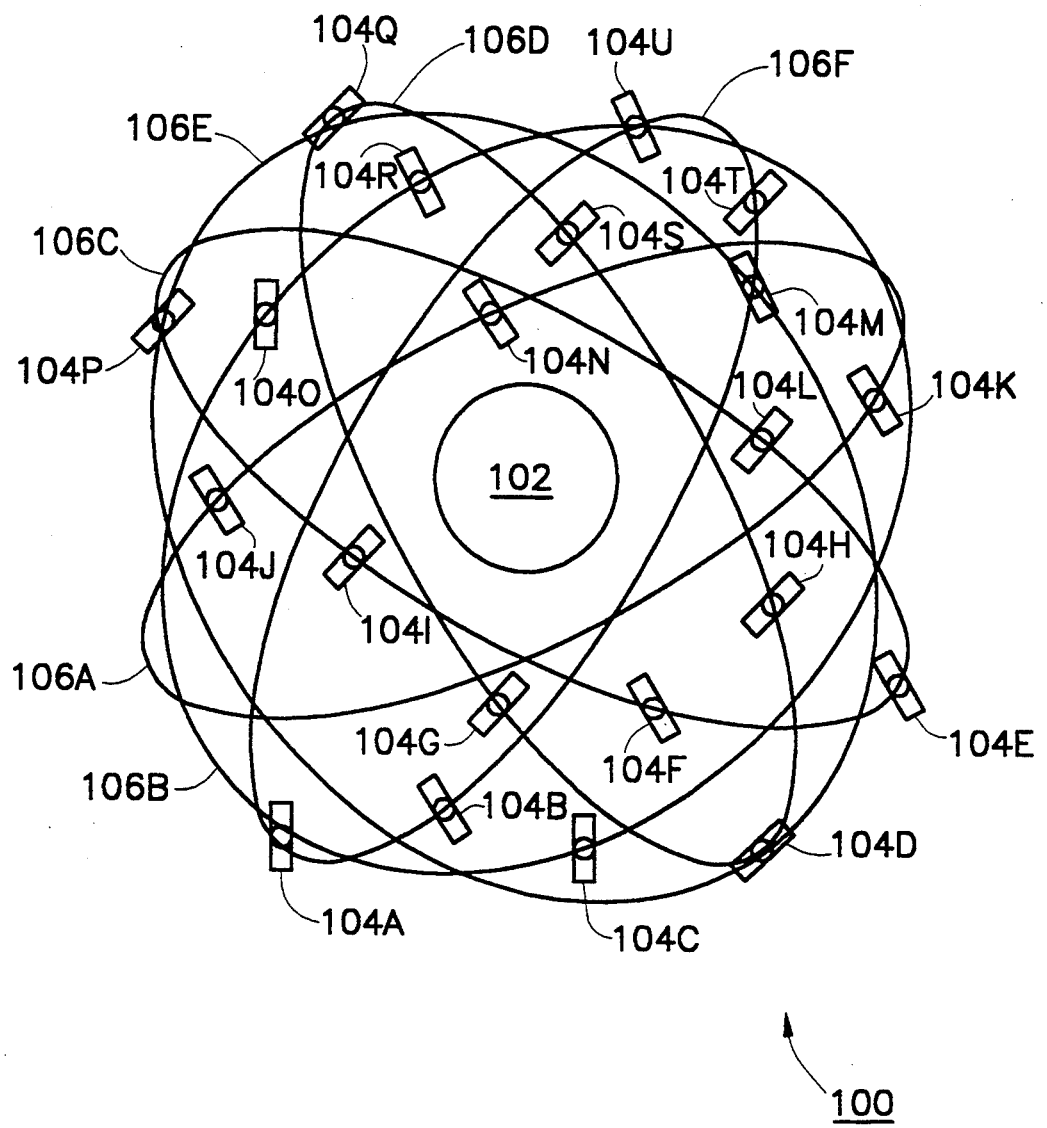
FIG. 1 is a graphical representation of a Global Positioning System (GPS) with twenty-one satellites in six orbits.

With reference to FIG. 1, the present invention is adapted to receive electromagnetic signals from the U.S. government's NAVSTAR Global Positioning System (GPS) satellites. The GPS 100, as shown, will consist of twenty-one satellites 104A–104U in six mutually orthogonal orbits 106A–106F about the Earth 102. The GPS 100 will also include three alternate satellites (not shown). However, the present invention is adaptable to work with other global positioning systems and is therefore not constrained to any one such system.

Figure 2:
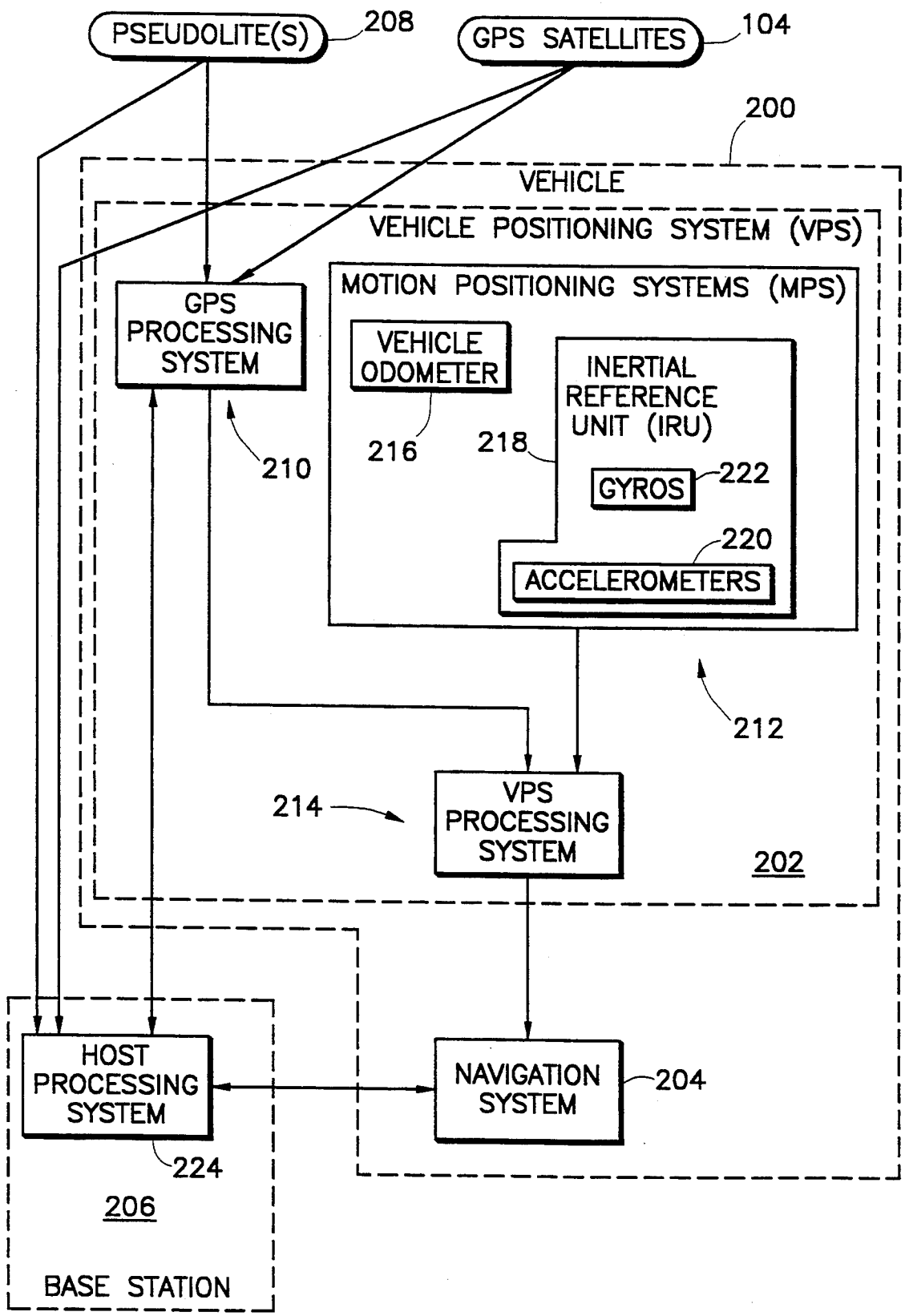
FIG. 2 is a block diagram of a terrestrial positioning system or Vehicle Positioning System (VPS) including a GPS processing system, a motion positioning system and a VPS processing system, according to an embodiment of the present invention.

With reference to FIG. 2, the present invention or position determining system or vehicle positioning system 202 is adapted to work with a navigation system 204. The navigation system 204 receives position information from the position determining system 202 and navigates a vehicle 200 by controlling its movements along a given path. In the preferred embodiment, the navigation system 204 is situated on board the vehicle 200. The navigation system 204 guides the vehicle 200 along pre-established or dynamically generated paths by generating models or conceptual representations of the path. For example, lines and arcs may be used to establish vehicle paths between objective points. Furthermore, mathematical B-splines or clothoid curves may be used to model the actual path the vehicle 200 is to navigate.

The vehicle positioning system (VPS) 202 receives signals from the GPS satellites 104. Additionally, one or more pseudolites 208 may be used. A pseudolite is a terrestrial based transmitter adapted to emulate a satellite. In the preferred embodiment, a base station 206 also receives signals from the satellites 104 and pseudolites 208. The base station 206 preferably includes a host processing system 224. The host processing system 224 performs functions for both the position determining apparatus 202 and the navigation system 204.

With respect to the position determining system 202, the host processing system 224 receives GPS data and/or data from a pseudolite. By using the received data the host processing system 224 serves as a known reference point to help improve the accuracy of vehicle position estimates (see below). The host processing system 224 determines biases or errors in the received data. The biases are then transmitted to the position determining system 202 aboard the vehicle 200. These biases are used to help eliminate the errors in the position estimates caused by the errors in the electromagnetic signals from the satellite.

The host processing system 224 further provides functions relating to the navigation system 204. The host processing system 224 handles scheduling and dispatching of the vehicle 200 with much the same results as a human dispatcher. Consequently, the host processing system 224 can thereby determine the work cycle of the vehicle 200.

The host processing system 224 at the base station 206 also includes a GPS processing system. The purposes of the host processing system 224 at the base station 206 are to (1) monitor the operation of the vehicle 200, (2) provide a known terrestrial reference point from which spatial biases can be produced, and (3) provide any other information to the vehicle 200 when necessary over a high-speed data communication channel.

In the preferred embodiment, the base station 206 will be located close to the vehicle 200, preferably within 20 miles. The close geographical relationship will provide for effective radio communication between the base station 206 and the vehicle 200 over the communication channel. It may also provide an accurate reference point for comparing satellite transmissions received by the vehicle 200 with those received by the base station 206.

A geographically proximate reference point is needed in order to compute accurate spatial biases. Spatial biases are, in effect, the common mode noise that exists inherently in the NAVSTAR GPS and the GPS processing system 210. For example, one form of spatial bias refers to the difference between the exact known location of the base station 206 and an estimate of the base station's position using the GPS 100. This difference is mainly due to the effects of the atmosphere on the electromagnetic signals transmitted by the satellites. These effects are generally referred to as "atmospheric bias". Once computed at the base station 206, the spatial biases are then sent to the vehicle 200 using the data-radio 320. Further methods for improving the accuracy of the position estimate using spatial biases are found in the above-referenced U.S. patent application Ser. No. 07/628,560.

In the preferred embodiment of the present invention, the host processing system 224 at the base station 206 further coordinates the autonomous activities of the vehicle 200 and interfaces the VPS processing system 214 with human supervisors.

The VPS 202 includes a means or GPS processing system 210. The GPS processing system 210 receives electromagnetic signals from a plurality of GPS satellites 104 and/or pseudolites 208 and responsively produces a first position estimate.

Figure 3:
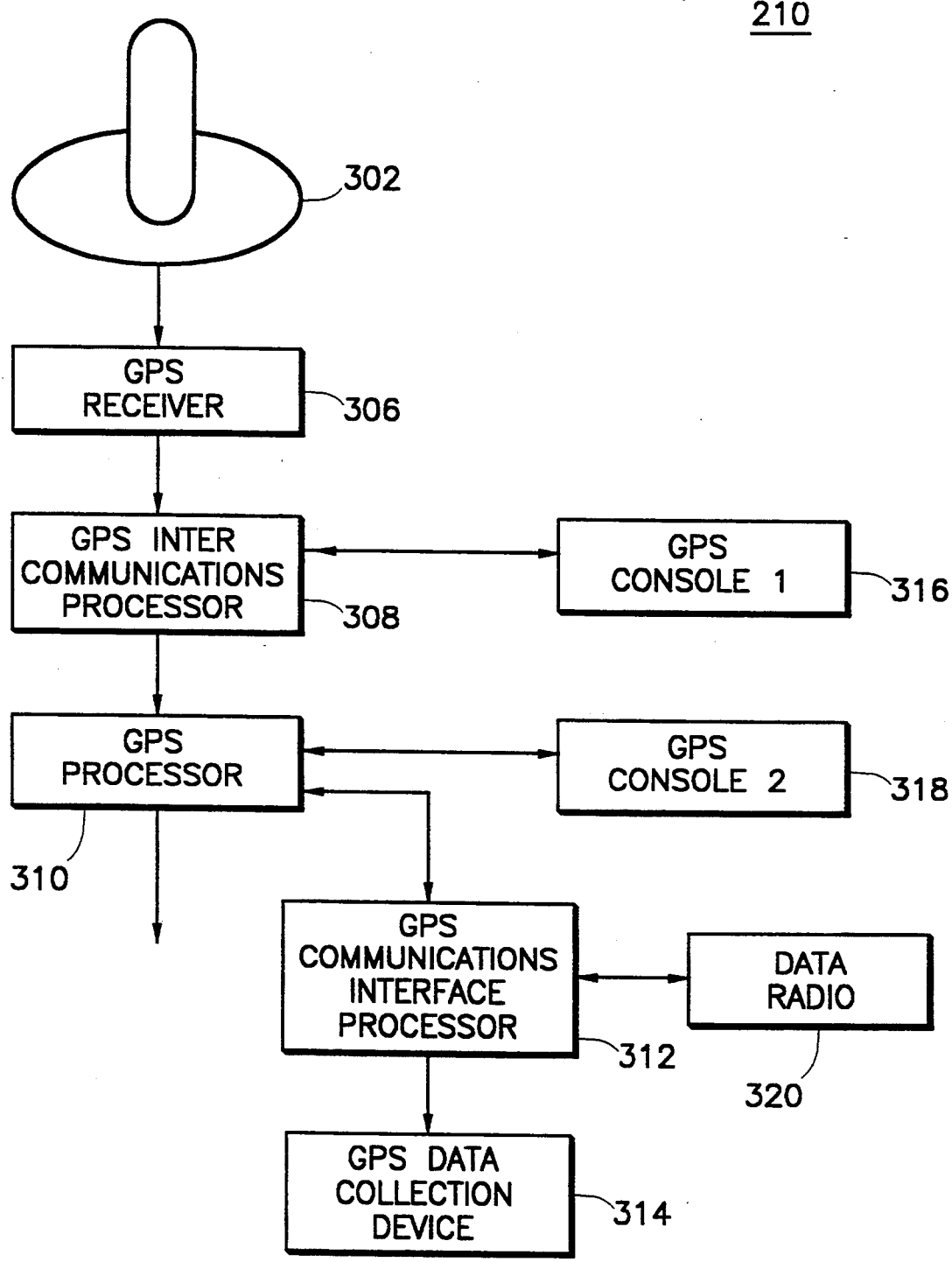
FIG. 3 is a block diagram of the GPS processing system of FIG. 2 including a GPS inter communications processor and a GPS processor, according to an embodiment of the present invention.

With reference to FIG. 3, the hardware configuration of the GPS processing system 210 is described according to an embodiment of the present invention. The GPS processing system 210 on board the vehicle includes a GPS antenna 302. In the preferred embodiment, the GPS antenna 302 is receptive to the radio spectrum of electromagnetic radiation. However, the present invention contemplates reception of any signal by which GPS satellites might encode data.

The GPS antenna 302 is coupled to a GPS receiver 306. The term "couple" is used to convey any system or method for establishing communication. Coupling systems or methods may include, for example, electronics, optics, and/or sound techniques as well as any others not expressly described herein.

In the preferred embodiment, the GPS receiver 306 processes the GPS data transmitted by the GPS satellites 104 and/or pseudolites 208. The GPS receiver 306 computes pseudoranges (ranges) for each of the GPS satellites for which data is received. These satellites are said to be in "view" of the GPS receiver 306. Pseudorange refers to an estimate of the distance between the GPS receiver 306 and a selected satellite as a function of the time delay between the signals' time of transmission and time of reception of an electromagnetic signal from the satellite. In the preferred embodiment, the GPS receiver 306 processes all of the actual pseudoranges in parallel. Suitable receivers are available from Magnavox Advanced Products And Systems of Torrance, Calif. as Model Nos. MX 4200, MX 4818 and MX 7120.

A GPS inter communications processor 308 couples the GPS receiver 306 to a GPS processor 310 and a first GPS console 316. In the preferred embodiment, the GPS inter communications processor 308 includes a microprocessor. A suitable microprocessor is available from Motorola, Inc. of Schaumburg, Ill. as Model No. MC68000. The GPS inter communications processor 308 coordinates data exchange between the GPS receiver 306, the GPS processor 310, and the first GPS console 316. Specifically, the GPS inter communications processor 308 receives pseudorange data from the GPS receiver 306 and relays the pseudorange data to the GPS processor 310. In the preferred embodiment, the pseudorange data includes the actual pseudoranges computed by the GPS receiver 306, the number of satellites being currently viewed by the receiver 306, and other GPS data needed by the GPS processor 310. The GPS inter communications processor 308 also relays status information regarding the GPS receiver 306 and GPS processor 310 to the first GPS console 316.

The GPS processor 310 uses a number of algorithms and methods to process the data it receives from the GPS receiver 306. The functions performed by the GPS processor 310 are discussed below in relation to FIGS. 4 and 8. In the preferred embodiment, the GPS processor 310 includes a microprocessor. A suitable microprocessor is available from Motorola, Inc. as part no MC68020.

The GPS processor 310 is coupled to a second GPS console 318 and a GPS communications interface processor 312. The second GPS console 318 provides the user interface from which the GPS processor 310 can be activated and monitored. The GPS console 318 is well known in the art and many types of devices are commercially available which provide the desired console function. One suitable device is available from Digital Equipment Corporation of Maynard, Mass., as model no. VT220.

The GPS communications interface processor 312 is essentially an input/output (I/O) board. It is coupled to a data radio 320 and a GPS data collection device 314. The GPS communications interface processor 312 coordinates data exchange between the GPS processor 310 and both the data radio 320 and the GPS data collection device 314. One suitable communications interface processor is available from Motorola, Inc., as model no. MVME331.

The data radio 320 establishes a communication link between the GPS processor 310 at the vehicle 200 to a similar data radio located at the base station 206. In the preferred embodiment, the data radio 320 communicates synchronously at a baud rate of 9600 using RF frequencies. The data radio at the base station 206 provides periodic updates on the amount of spatial bias for each satellite to the data radio 320 on the vehicle 200 at a rate of 2 Hz (twice a second).

The GPS data collection device 314 can be any of numerous common electronic processing and storage devices such as a desktop or portable computer.

Figure 4:
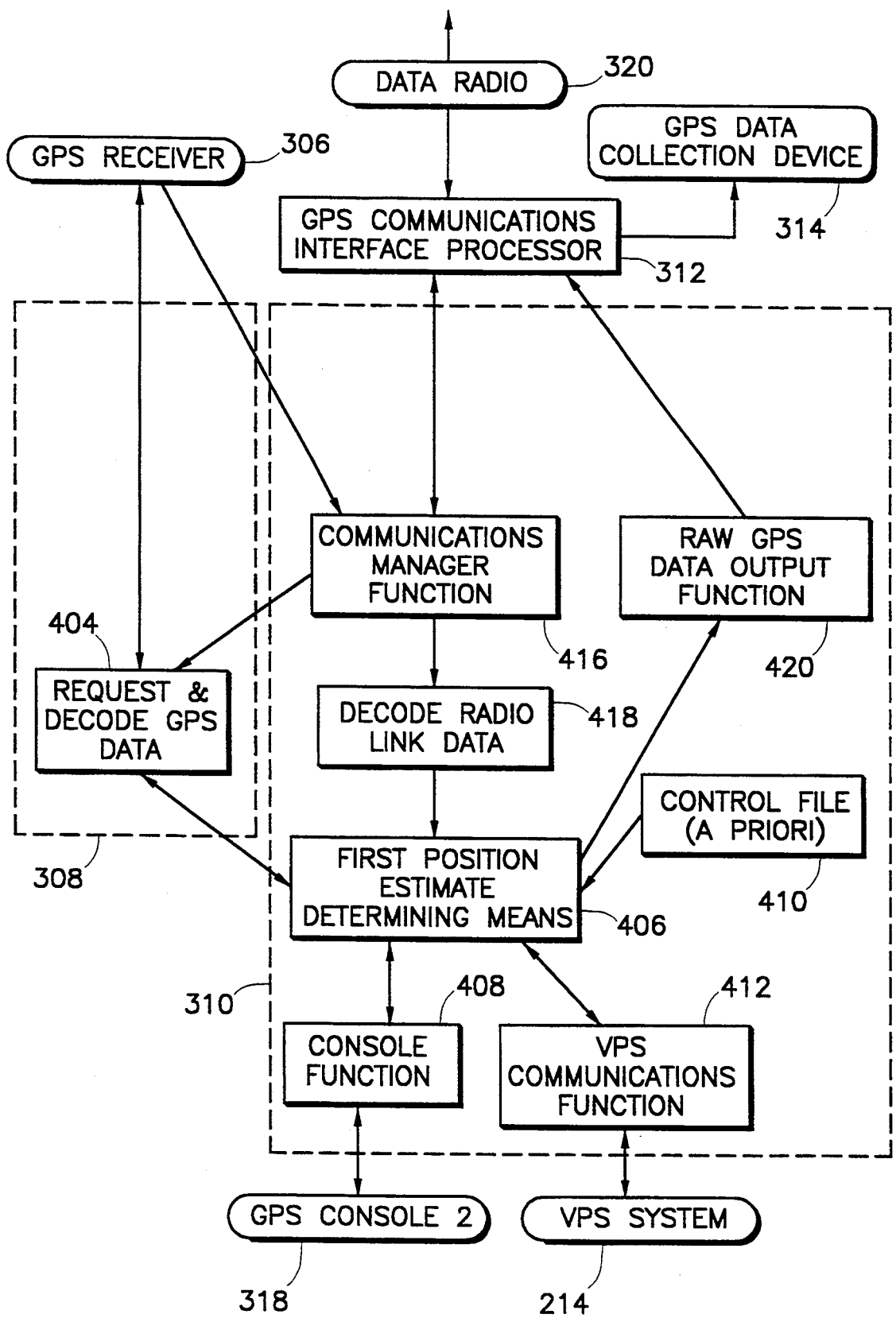
FIG. 4 is a functional block diagram of the GPS inter communications processor and the GPS processor of FIG. 3 including a first position estimate determining means, according to an embodiment of the present invention.

With reference to FIG. 4, the GPS inter communications processor 308 implements a request and decode GPS data function 404. As shown, the data transmitted from the GPS receiver 306 enters the request and decode GPS data function 404 and is relayed to the GPS processor 310.

The GPS Processor 310 implements a means 406 for determining a first position estimate. A console function 408 controls data exchange between the first position estimate determining means 406 and the second GPS console 318. A VPS communications function 412 responsively controls data exchange between the first position estimate determining means 406 and the VPS system 214.

A control file 410 contains a prior saved file and describes how the GPS data is to be utilized by the first position estimate determining means 406. For example, the control file 410 describes the noise threshold, the speed of the response, the initial states of vehicle position and velocity, the extent of deviation before a reset of the first position estimate determining means 406 occurs, the number of bad measurements allowed, and/or the time allotted between measurements.

A communications manager function 416 controls the request and decode function 404 of the GPS inter communications processor 308 and relays the GPS data to the first position estimate determining means 406 through a decode radio link data function 418. The communications manager function 416 further controls the flow of data from the data radio 320 to the first position estimate determining means 406. Data from the first position estimate determining means 406 to the data radio 320 flows through a raw GPS data output function 420.

Referring again to FIG. 2, the VPS 202 includes a means 212 for producing a second position estimate and a means 214 for receiving the first and second position estimates and responsively producing a third position estimate. The second and third position estimate producing means 212, 214 are hereinafter referred to as the motion positioning system (MPS) and the VPS processing system, respectively. Usually, the second position estimate is combined with the first position estimate and filtered to form a more accurate third position estimate. However, it is envisioned that in some instances the second position estimate may be utilized exclusively when the first position estimate is deemed to be drastically inaccurate.

Preferably, the MPS 212 includes an odometer 216 and an inertial reference unit (IRU) 218. However, the IRU 218 could be utilized without the odometer 216. The IRU 218 includes ring-laser gyros 222 and accelerometers 220 of known design. In the preferred embodiment, the IRU 218 is a replica of the system used by Boeing 767 aircrafts, but has been modified to account for the lessor dynamics of the vehicle 200 relative to the 767 aircraft.

The IRU 218 is adapted to output vehicle position at 5 Hz, velocity at 10 Hz, and roll, pitch and yaw at 50 Hz. Furthermore, the odometer 216 is adapted to output the distance traveled by the vehicle 200 at 20 Hz.

The laser gyroscopes of the IRU 218, must at first be given an estimate of the latitude, longitude and altitude of the vehicle 200. Using this data as a baseline position estimate, the gyroscopes 222 then use a predefined calibration in conjunction with forces associated with the rotation of the Earth 102 to determine as estimate of the vehicle's 200 current position.

This information is then combined by the IRU 218 with data acquired by the accelerometers 220 to produce a more accurate, second position estimate of the vehicle's current position.

Figure 5:
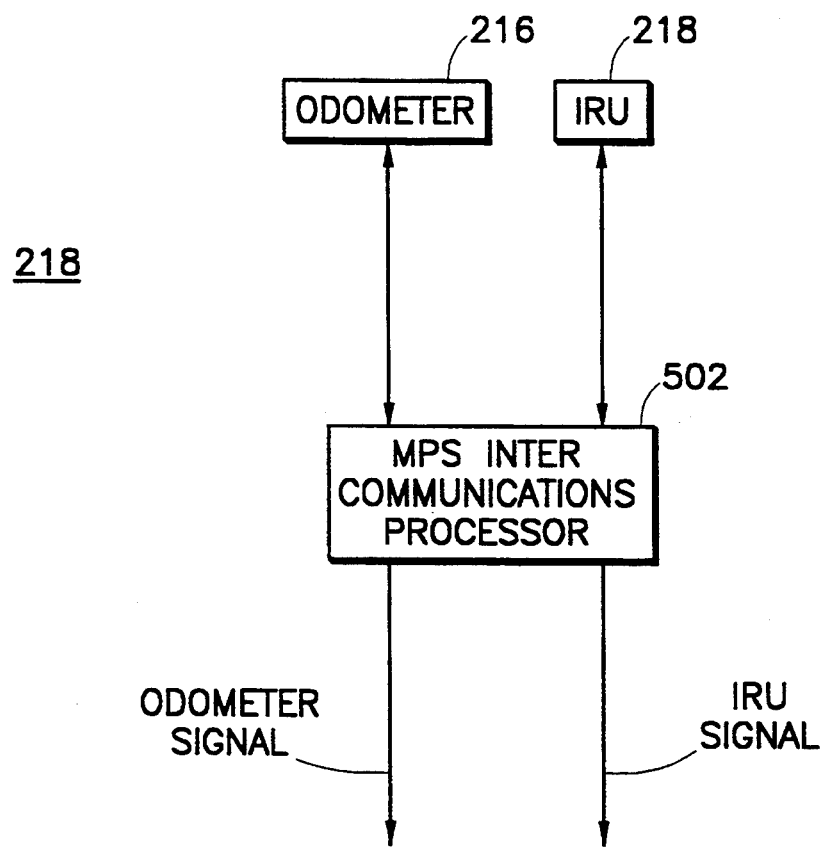
FIG. 5 is a block diagram of the motion processing system of FIG. 2, according to an embodiment of the present invention.

With reference to FIG. 5, the MPS 212 includes an MPS inter communications processor 502. The odometer 216 and the IRU 218 are coupled to the VPS processing system 214 by the MPS inter communications processor 502. The second position estimate and the data from the odometer 216 are transmitted to the VPS processing system 214 by the MPS inter communications processor 502. In the preferred embodiment, the MPS inter communications processor 502 includes a microprocessor. One suitable microprocessor is available from Motorola, Inc. as part no. MC68000. The MPS inter communications processor 502 coordinates data exchange between the MPS 212 and the VPS processing system 214.

Figure 7:
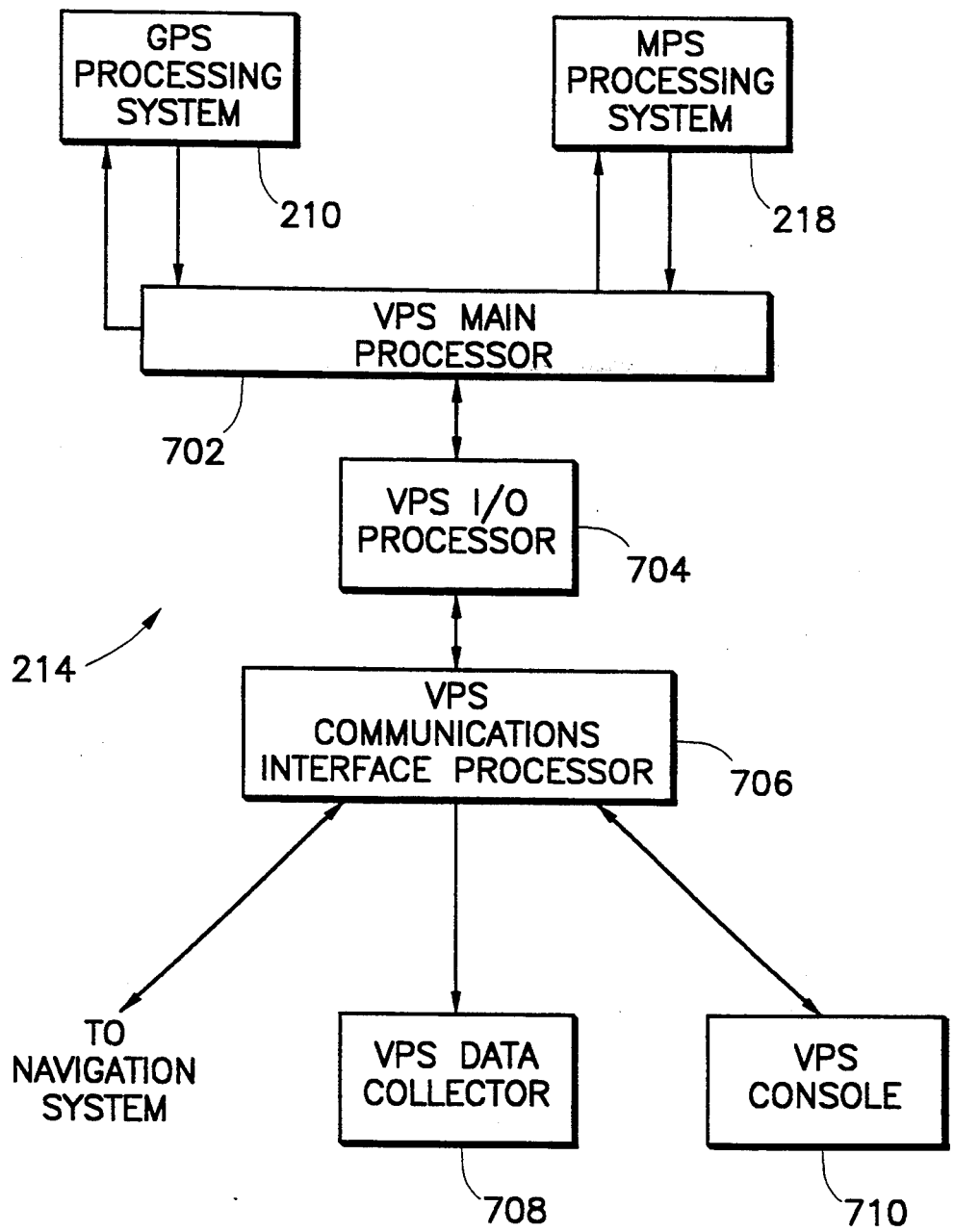
FIG. 7 is a block diagram of the VPS processing system of FIG. 2, according to an embodiment of the present invention.

With reference to FIG. 7, the preferred embodiment of the architecture of the VPS processing system 214 is depicted. The GPS processing system 210 and MPS 212 are independently coupled to the VPS main processor 702. Because they are independent, the failure of one of the systems will not cause the other to become inoperative. Thus, if the GPS processing system 210 is not operative, data can still be collected and processed by the MPS 212 and, conversely, the VPS 214. The GPS processing system 210 and the MPS 212 transmit signals to the VPS main processor 702, as shown. These signals contain position, velocity, time, pitch, roll, yaw, and distance data.

The VPS main processor 702 is coupled to a VPS I/O processor 704. The VPS main processor 702 transmits the third position estimate to the VPS I/O processor 704, as shown. The third position estimate is derived from the GPS, IRU, and odometer data noted above, and more specifically, the first and second position estimates of the vehicle 200.

The present invention contemplates any system and method by which the signals can be received by the VPS main processor 702 from the GPS processing system 210 and MPS 212 and forwarded to the VPS main processor 702. In the preferred embodiment, the VPS main processor 702 includes a microprocessor. One suitable microprocessor is commercially available from Motorola, Inc. as part no. MC68020.

Figure 6:
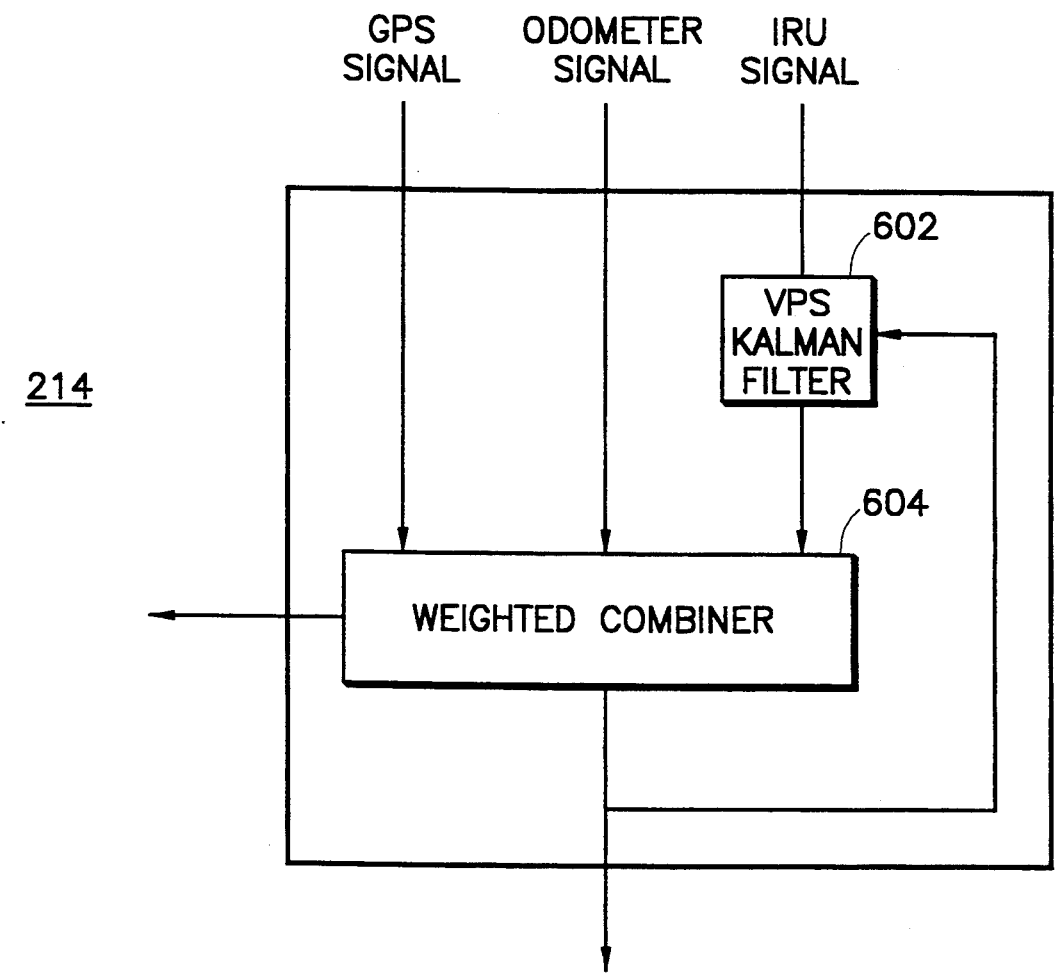
FIG. 6 is a functional block diagram of the VPS processing system of FIG. 2, according to an embodiment of the present invention.

With reference to FIG. 6, the VPS main processor 702 implements a VPS Kalman filter 602 and a weighted combiner 604. As shown, the GPS signal and the odometer signal are transmitted directly to the weighted combiner 604. The IRU signal is transmitted into the VPS Kalman filter 602. In the preferred embodiment, the GPS signal is transmitted at a rate of 2 Hz. The odometer signal is transmitted at a rate of 20 Hz. Moreover, the IRU signal, which includes the second position estimate, is transmitted at a rate of 50 Hz.

A Kalman filter is a recursive algorithm which is normally implemented via software or firmware on a digital computer. The Kalman filter assumes that noisy signals are discrete rather than continuous in nature. Both the data and noise are modeled in vector form and the data is processed recursively.

A Kalman filter performs two functions. First, it extrapolates a data estimate from previous data. Second, it updates and refines the extrapolated data estimate based on current data. For example, if a vehicle position p1 and velocity v1 are known at time t1, then the filter (performing the extrapolating step) will use p1 and v1 to estimate p2 at a time t2. Thereafter (performing the update step), newly acquired data at time t2 is used to refine the position estimate p2. Data which is fed to the Kalman filter to aid in either the extrapolation or the update/refinement steps is said to "constrain" the filter.

Kalman filtering is well known in the art. For a more detailed discussion on Kalman filtering, see Brown, R. G., "Kalman Filtering: A Guided Tour," Iowa State University; and Kao, Min H. and Eller, Donald H., "Multiconfiguration Kalman Filter Design for High-Performance GPS Navigation," *IEEE Transactions on Automatic Control*, Vol. AC-28, No. 3, March 1983.

An alternative to Kalman filtering, least squares estimation or best fit polynomial matching may be used.

The VPS Kalman filter 602 processes the IRU signal, filters extraneous noise from the data, and outputs the processed data to the weighted combiner 604. Further, the VPS Kalman filter 602 receives a signal from the weighted combiner 604, which is used to reset the VPS Kalman filter 602 with new position information.

The weighted combiner 604 processes the signals and gives a predetermined weighing factor to each data based on the estimated accuracy of data gathering technique used. Thus, in the preferred embodiment, the first position estimate is weighted heavier than the second position estimate of the IRU signal. The reason for this weighing scheme is that the first position estimate is inherently more accurate than the second position estimate from the IRU.

However, velocity can be more accurately determined by the IRU 218. Therefore, the velocity component of the IRU signal can be weighted heavier than the velocity component of the GPS signal. In the preferred embodiment of the present invention, the velocity component of the IRU signal is used exclusive of the velocity component of the GPS signal.

The weighted combiner 604 produces an output at 20 Hz. The output contains all computed data and is sent to two locations: the VPS Kalman filter 602 and the VPS I/O processor 704. The output contains time information relative to the GPS satellites. The output further contains information relative to vehicle position, velocity, roll, pitch, and yaw. Finally, note that the VPS output comprises the third position estimate of the vehicle 200.

Another output from the weighted combiner 604 contains only velocity data pertaining to the vehicle 200. This velocity data is sent to the GPS processing system 210 from the VPS main processor 702. The velocity data is used to increase the accuracy of first position estimates.

Referring back to FIG. 7, the VPS I/O processor 704 is coupled to a VPS communications interface processor 706. In the preferred embodiment, the communications interface processor 706 is the MVME331 processor, which is commercially available from Motorola, Inc. Any processor accomplishing the same purpose as described below may be utilized.

In the preferred embodiment, the VPS communications interface processor 706 is coupled to three different devices: (1) a VPS console 710, (2) a data collection device 708, and (3) the navigation system 204. The VPS communications interface processor 706 routes the data, including the third position estimate, to the above three devices at a rate of 20 Hz.

The VPS console 710 is well known in the art, and is commercially available from Digital Equipment Corporation, of Minneapolis, Minn., Model Number VT220. This VPS console 710 is used to display the current status of the VPS I/O processor 704.

The VPS data collection device 708 can be any of numerous commercially available electronic processing and storage devices, for example, a desktop or portable computer.

Figure 8:
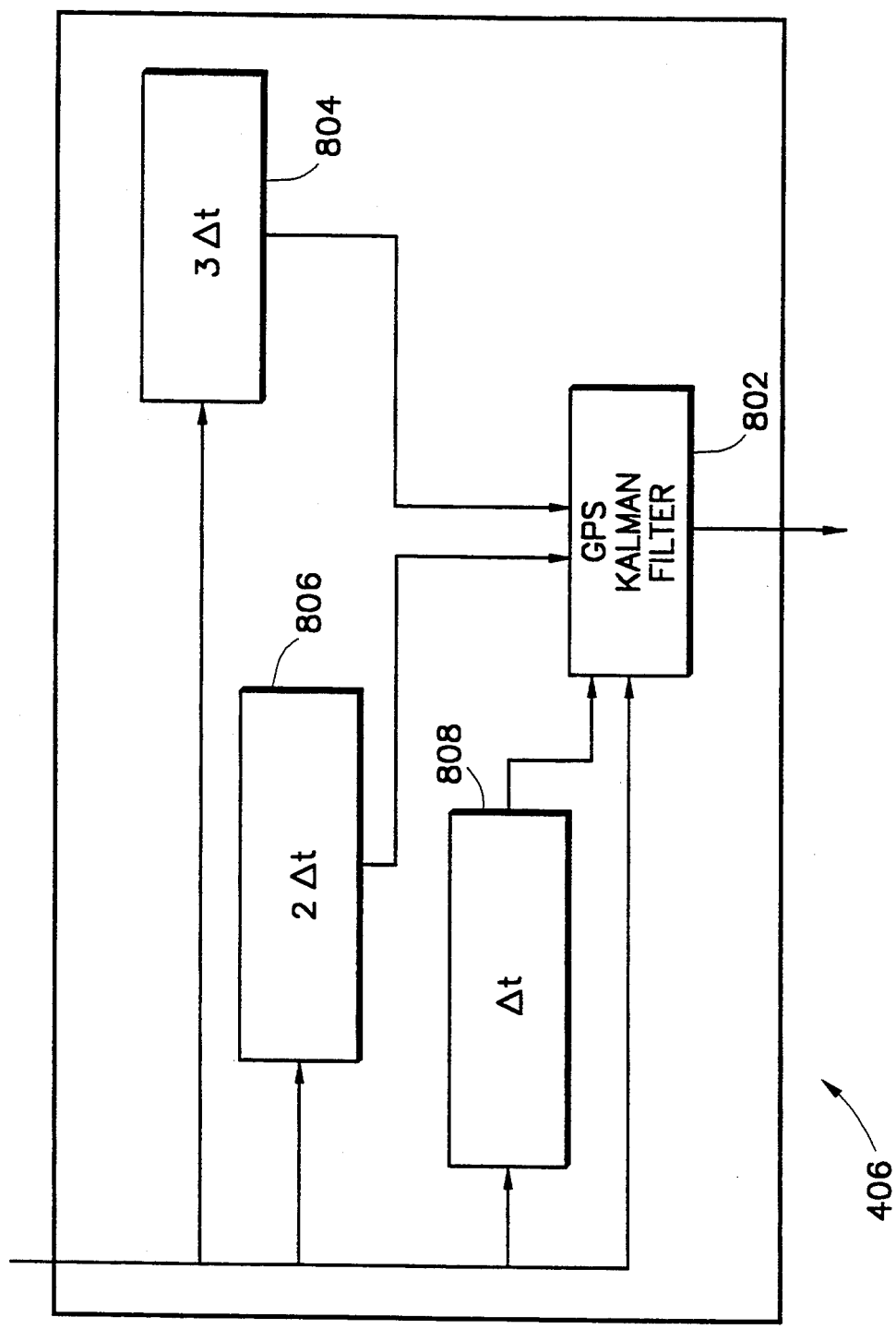
FIG. 8 is a functional block diagram of the first position estimate determining means of FIG. 4, according to an embodiment of the present invention.
Figure 9:
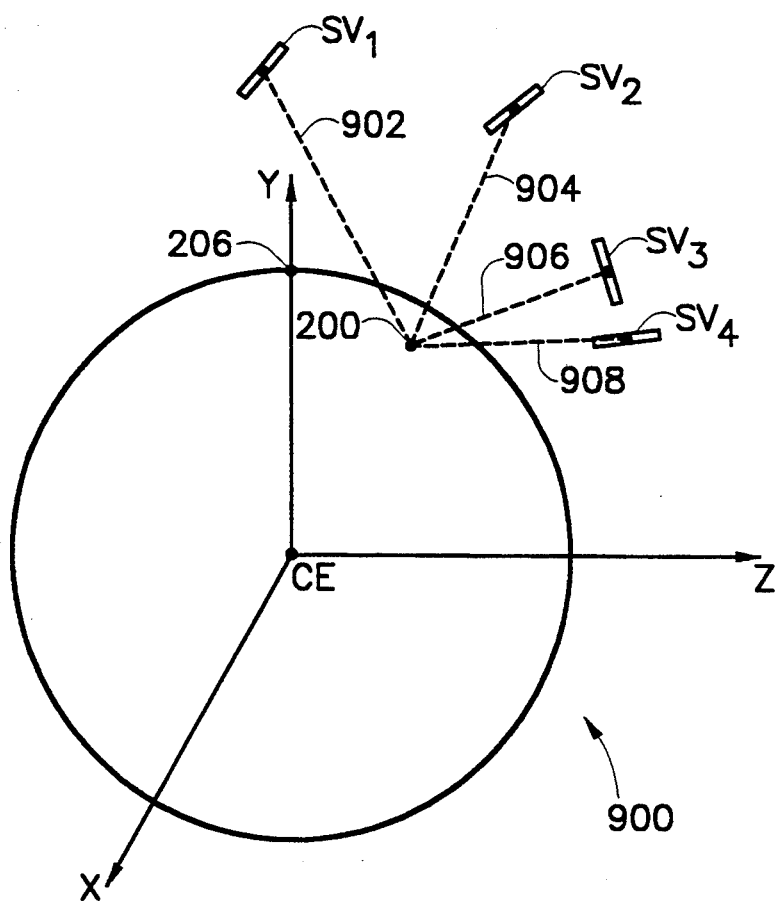
FIG. 9 is a graphical representation of a satellite constellation.

With reference to FIGS. 8–12, the present invention is adapted to provide a first position estimate during periods when only one satellite is visible or available. As shown in FIG. 8, the first position estimate producing means 406 includes a Kalman filter 802.

In part, the function of the Kalman filter 802 is to filter out noise associated with the pseudorange data. The noise may include, for example, ionospheric, clock, and/or receiver noise. The GPS Kalman filter 802 of the host processing system 224 at the base station 206 computes spatial biases which are transmitted to the vehicle 200 for increasing the accuracy of first position estimates. In contrast, the GPS Kalman filter 802 in the vehicle 200 takes into consideration the spatial biases which are received from the base station 206.

The GPS Kalman filter 802 functions in a semi-adaptive manner. In other words, the GPS Kalman filter 802 automatically modifies its threshold of acceptable data perturbations, depending on the velocity of the vehicle 200. The term "perturbation" in the context of this document refers to a deviation from a regular course. The semi-adaptive functioning of the GPS Kalman filter 802 optimizes the response and the accuracy of the present invention.

Generally, when the vehicle 200 increases its velocity by a specified amount, the GPS Kalman filter 802 will raise its acceptable noise threshold. Similarly, when the vehicle 200 decreases its velocity by a specified amount the GPS Kalman filter 802 will lower its acceptable noise threshold. This automatic optimization technique of the present invention provides the highest degree of accuracy under both moving and stationery conditions.

Preferably, the threshold of the GPS Kalman filter 802 does not vary continuously or in very minute discreet intervals. Rather, the intervals are larger discreet intervals and, therefore, less accurate than a continuously varying filter. However, the Kalman filter 802 of the present invention is easy to implement, less costly, and requires less computation time than with a continuously varying filter. However, it should be noted that using a continuously varying filter is possible and is intended to be included herein.

In operation, the GPS Kalman filter 802 must be given an initial value at system start-up. From the initial value and GPS data collected by the GPS receiver 306, the GPS Kalman filter 802 extrapolates a current state (which includes the first position estimate and the vehicle velocity for northing, easting and altitude). The GPS Kalman filter 802 operates in a cyclical manner. In other words, the extrapolated current state is assumed to be the initial value for the next iteration. It is combined/filtered with new GPS data (an update) to derive a new current state.

In normal operation (at least four satellites are visible), the first position estimate determining means 406 calculates the first position estimate using the received GPS data. For example, with reference to FIG. 9, the GPS receiver 306 on the vehicle 200 receives GPS data from four satellites, $SV_1$, $SV_2$, $SV_3$, and $SV_4$. The GPS receiver determines the position of each satellite and the respective ranges from each of the satellites, as represented by the dotted lines 902, 904, 906, 908. Using the received data the vehicle's Cartesian coordinates with respect to the center of the Earth, CE, are determined by solving the equations:

$$(X_1 - U_x)^2 + (Y_i - U_y)^2 + (Z_1 - U_z)^2 = (R_1 - C_b)^2 \quad (1)$$

$$(X_2 - U_x)^2 + (Y_2 - U_y)^2 + (Z_2 - U_z)^2 = (R_2 - C_b)^2 \quad (2)$$

$$(X_3 - U_x)^2 + (Y_3 - U_y)^2 + (Z_3 - U_z)^2 = (R_3 - C_b)^2 \quad (3)$$

$$(X_4 - U_x)^2 + (Y_4 - U_y)^2 + (Z_4 - U_z)^2 = (R_4 - C_b)^2 \quad (4)$$

where, $X_n$, $Y_n$, $Z_n$ are the x, y, z coordinates of the satellite designated by n, $R_n$ is the respective pseudorange, $C_b$ is the clock bias, and $U_x$, $U_y$, and $U_z$ are the estimated Cartesian coordinates of the vehicle 200. The vehicle's latitude and longitude are determined by:

$$U_{lat} = \cos^{-1}\left(\frac{[U_x^2 + U_y^2]^{\frac{1}{2}}}{|U|}\right) \quad \text{EQU. 5}$$

$$U_{long} = \tan^{-1}(U_x/U_y) \quad \text{EQU. 6}$$

where, $$|U| = [U_x^2 + U_y^2 + U_z^2]^{\frac{1}{2}}$$

where, $|U| = [U_x^2 + U_y^2 + U_z^2]^{\frac{1}{2}}$ \quad (6A)

Typically, vehicle position is determined in this manner. However, as stated above, at some periods there may be less than the required number of satellites available. This may result from the terrain, obstacles, selective availability, atmospheric interference, or other reason. The present invention provides system and method for determining the vehicle's position using only one satellite.

For example, when only one satellite is in view, that is, the GPS processing system 210 receives valid or good data from only one satellite, the GPS processing system 210 is adapted to determine the position of the vehicle 200 using the range data from that satellite.

Referring again to FIG. 8, in the preferred embodiment, the system 202 includes means 804, 806, 808 for receiving ranges and responsively determining a set of ranges. The set of ranges includes a series of successive ranges, separated in time by a predetermined time delay, $\Delta t$.

Figure 10:
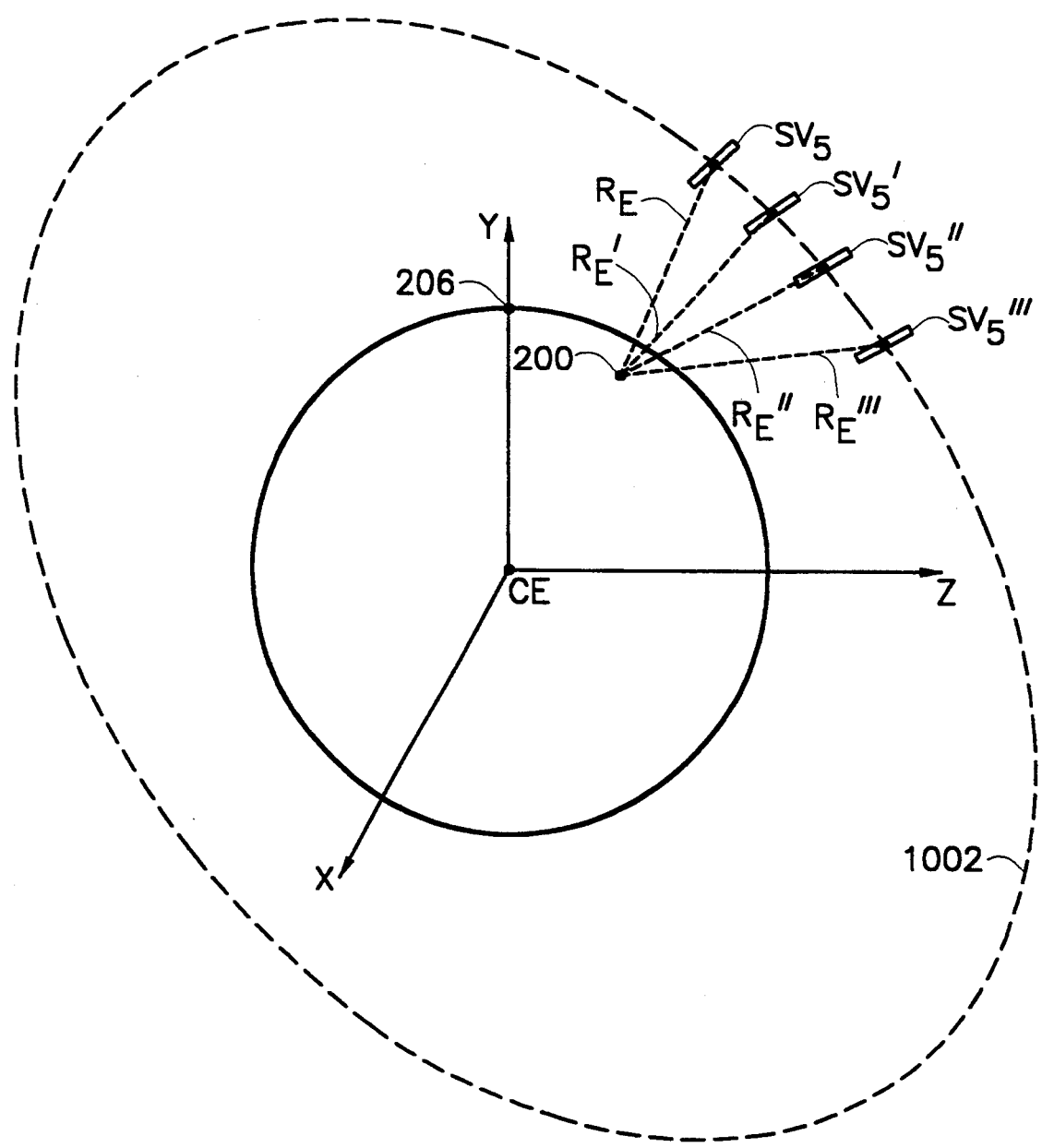
FIG. 10 is a geometric representation of a satellite constellation consisting of three positions of one satellite spaced apart in time.

In one embodiment, the set of ranges is used to produce a first position estimate as described below. In another embodiment, the set of ranges is used to produce the vehicle's position. As shown in FIG. 10, each range in the set corresponds to four positions of $SV_5$ separated in time along the satellite's orbit 1002. The ranges are denoted by $R_E$, $R'_E$, $R''_E$, and $R'''_E$ and the corresponding positions by $SV_5$, $SV'_5$, $SV''_5$, and $SV'''_5$. The first satellite position, $SV_5$ corresponds to a first time, $t_1$. The fourth or last satellite position corresponds to the current or fourth time, $t_4$. The four ranges are delivered to the GPS Kalman filter 802. The GPS Kalman filter 802 uses the ranges as if the ranges were from four different satellites. The vehicle's position is then estimated by solving the following equations:

$$(X_5 - U_x)^2 + (Y_5 - U_y)^2 + (Z_5 - U_z)^2 = (R_E - C_b)^2 \quad (7)$$

$$(X'_5 - U_x)^2 + (Y'_5 - U_y)^2 + (Z'_5 - U_z)^2 = (R'_E - C_b)^2 \quad (8)$$

$$(X''_5 - U_x)^2 + (Y''_5 - U_y)^2 + (Z''_5 - U_z)^2 = (R''_E - C_b)^2 \quad (9)$$

$$(X'''_5 - U_x)^2 + (Y'''_5 - U_y)^2 + (Z'''_5 - U_z)^2 = (R'''_E - C_b)^2 \quad (10)$$

where $X_5, Y_5, Z_5$; $X'_5, Y'_5, Z'_5$; $X''_5, Y''_5, Z''_5$ and $X'''_5, Y'''_5, Z'''_5$ are the Cartesian coordinates of the respective satellite positions, $SV_5$, $SV'_5$, $SV''_5$ and $SV'''_5$.

In a second embodiment, the vehicle's position is estimated in a similar manner while adjusting for the vehicle's velocity. EQUs. 7–10 become:

$$(X_5 - U_{x1})^2 + (Y_5 - U_{y1})^2 + (Z_5 - U_{z1})^2 = (R_E - C_b)^2 \quad (11)$$

$$(X'_5 - U_{x2})^2 + (Y'_5 - U_{y2})^2 + (Z'_5 - U_{z2})^2 = (R'_E - C_b)^2 \quad (12)$$

$$(X''_5 - U_{x3})^2 + (Y''_5 - U_{y3})^2 + (Z''_5 - U_{z3})^2 = (R''_E - C_b)^2 \quad (13)$$

$$(X'''_5 - U_{x4})^2 + (Y'''_5 - U_{y4})^2 + (Z'''_5 - U_{z4})^2 = (R'''_E - C_b)^2 \quad (14)$$

where $$U_{xe} = U_{x4} + V_{x3}\Delta t \quad (15)$$

$$U_{y3} = U_{y4} + V_{y3}\Delta t \quad (16)$$

$$U_{z3} = U_{z4} + V_{z3}\Delta t \quad (17)$$

$$U_{x2} = U_{x4} + V_{x3}\Delta t + V_{x2}\Delta t \quad (18)$$

$$U_{y2} = U_{y4} + V_{y3}\Delta t + V_{y2}\Delta t \quad (19)$$

$$U_{z2} = U_{z4} + V_{z3}\Delta t + V_{z2}t \quad (20)$$

$$U_{x1} = U_{x4} + V_{x3}\Delta t + V_{x2}\Delta t + V_{x1}\Delta t \quad (21)$$

$$U_{y1} = U_{y4} + V_{y3}\Delta t + V_{y2}\Delta t + V_{y1}\Delta t \quad (22)$$

$$U_{z1} = U_{z4} + V_{z3}\Delta t + V_{z2}\Delta t + V_{z1}\Delta t \quad (23)$$

Also note that the current position, that is, the desired result, is defined by $U_{x4}$, $U_{y4}$, and $U_{z4}$. The velocity of the vehicle at times $t_1$, $t_2$, and $t_3$ is represented by the vectors, $V_1$, $V_2$, and $V_3$, respectively. In EQUs 11–23, the vectors are broken down into their Cartesian coordinates:

$V_{x1}, V_{y1}, V_{z1}$ $V_{x2}, V_{y2}, V_{z2}$; and $V_{x3}, V_{y3}, V_{z3}$, respectively In one embodiment, the velocity of the vehicle 200 is supplied by the IRU 218. In another embodiment, the velocity of the vehicle 200 is computed by determining the phase shift or change in the signals received from the satellite. Since the satellite is in motion and the motion is predictable from the ephemeris data, an expected phase shift can be computed from the ephemeris data. By comparing the expected phase shift with the actual phase shift, the velocity of the vehicle can be computed. In still another embodiment the velocity is computed using both the IRU 218 and the phase shift method and the results are filtered or averaged.

In one embodiment, $\Delta t$ is equal to a constant predetermined time period, for example one half (0.5) or one (1.0) seconds. New satellite position and pseudorange information is calculated and a new position estimate is determined every Δt seconds using the current satellite position and pseudorange and the three previous satellite positions and pseudoranges separated in time by Δt.

In another embodiment, new satellite position and pseudorange information is calculated and a new position estimate is determined every sample, for example, 0.5 or 1.0 second. However, Δt is equal to a larger time period, for example one (1) hour. At every sample period, the vehicle's position is estimated using the current satellite position and pseudorange ($t_4=0$) and the three previous satellite positions and pseudoranges ($t_3=-1$ hr, $t_2=-2$ hrs, $t_1=-3$ hrs). The velocity of the vehicle is also determined every sample, but is summed for the appropriate time period to adjust for the vehicle's motion during that time period.

For example, for $t_3$, the satellite's position and the pseudorange from one hour ago are used. However, the vehicle's position is updated by adding the vehicle's velocity vectors for that time period. If $t_3=-1$ hr and the sample period is 0.5 seconds, the vehicle's total velocity for that time period would be calculated as the sum of 7200 vectors measured every 0.5 seconds over the last hour. Furthermore at the sample, the oldest velocity vector would be dropped (subtracted) and the latest velocity vector would be included (added) and the positions updated accordingly. A similar approach is used for $t_1$ and $t_2$.

In still another embodiment, a new position is estimated every sample. However, Δt is equal to a larger time period and not constant. For example, the first time ($t_1$) is held at a constant reference point in time, preferably when the vehicle's velocity is zero. In this embodiment the period of time between the first and fourth times increases every sample period. Preferably, the second and third times, $t_2$ and $t_3$ are separated from $t_1$, by some predetermined period of time.

In still another embodiment, the base station 206 is adapted to calculate velocity biases. The host processing system 224 of the base station 206 receives the signals from the one satellite, determines the signal's phase shift and calculates the satellite's velocity. The host processing system 224 compares the calculated velocity to an expected velocity (from the almanac data) and transmits the difference to the vehicle 200. The difference or velocity bias is used to correct the calculated vehicle velocity.

Figure 11:
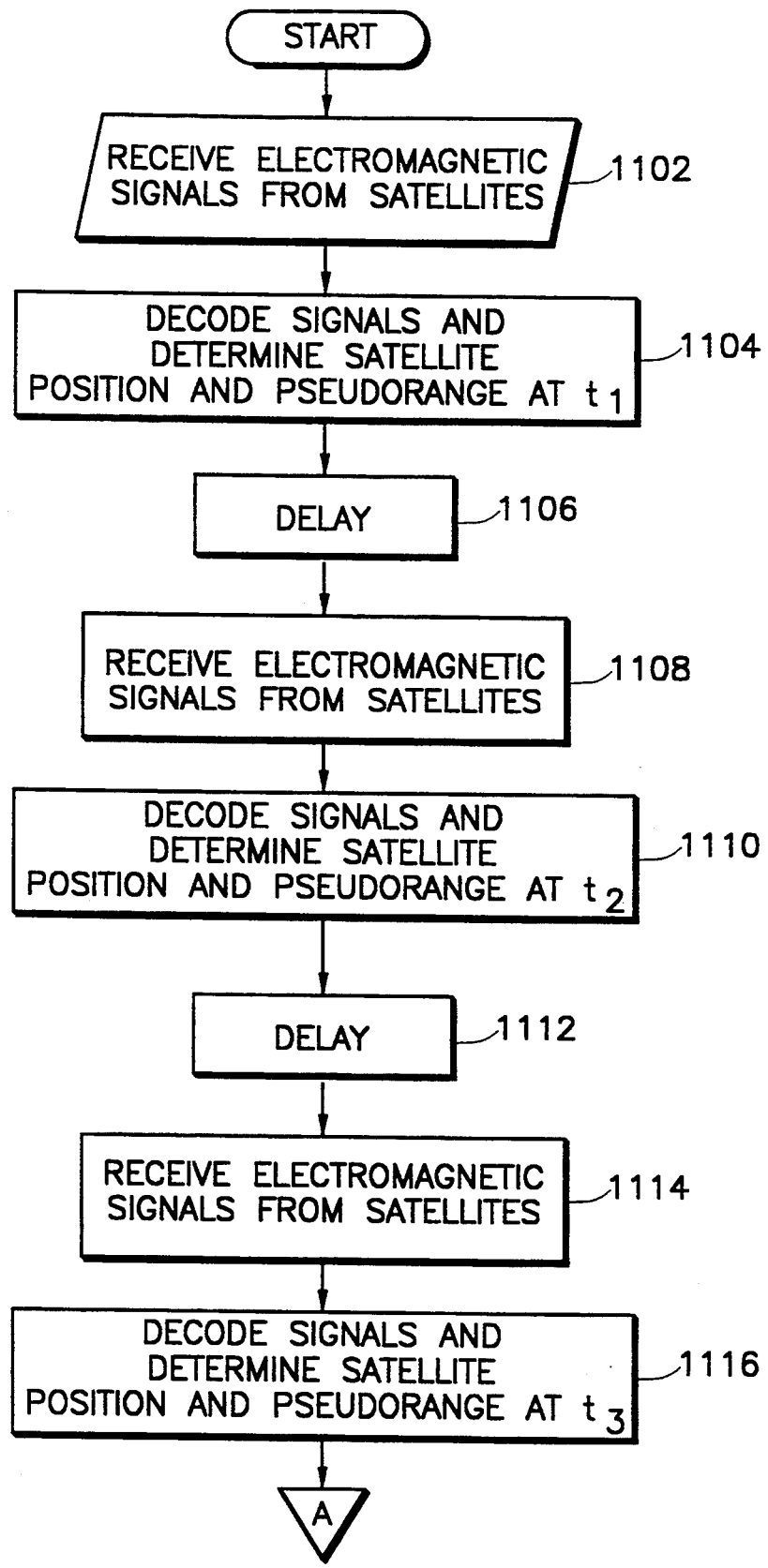
FIG. 11 is a first portion of a flow diagram of a control scheme for determining the position of a vehicle, according to an embodiment of the present invention.

With reference to FIG. 11, a method for determining the position of a vehicle 200, according to one embodiment of the present invention is described. In control block 1102, the electromagnetic signals from a single satellite $SV_5$ are received. In control block 1104, the signals are decoded. From the decoded information, the satellite's position, the first position, and the pseudorange corresponding to the first position at a first time, $t_1$, are determined in control block 1104.

In control block 1106, control is delayed for a predetermined period of time. Then, the process is repeated to obtain a second position of the satellite, $SV'_5$, and second pseudorange at a second time, $t_2$, in control blocks 1108 and 1110.

In control block 1112, control is delayed for a predetermined period of time. Then control blocks 1114 and 1116, a third position of the satellite and a third pseudorange at a third time, $t_3$, are determined using decoded signals.

Figure 12:
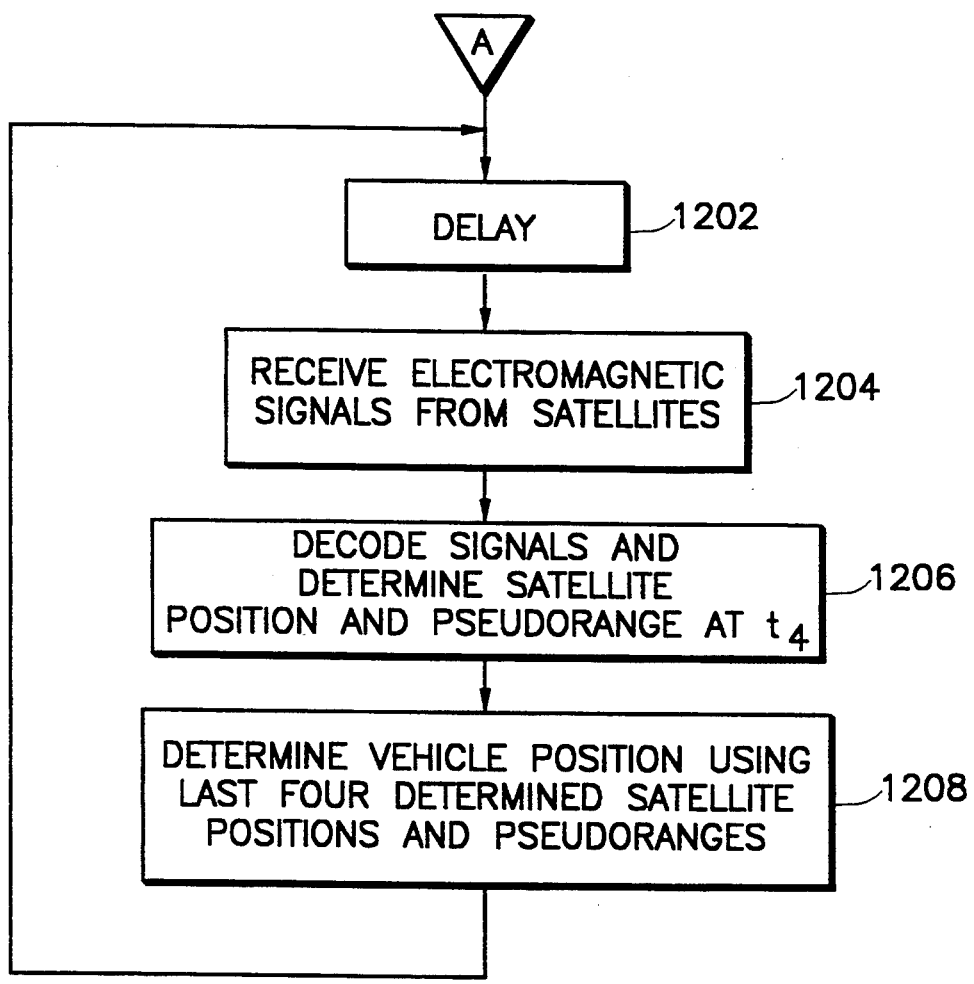
FIG. 12 is a second portion of a flow diagram of a control scheme for determining the position of a vehicle, according to the embodiment of the present invention of FIG. 11.

Referring to FIG. 12 in control block 1202, control is delayed for a predetermined period of time. Then in control blocks 1204 and 1206, a fourth position of the satellite and a fourth pseudorange at a fourth time, $t_4$, are determined using decoded signals. Each subsequent position/pseudorange pair is separated from the prior pair by a predetermined sample time.

In control block 1208, an estimate of the vehicle's position is determined using triangulation methods. Each position/pseudorange pair is treated as an individual satellite and the position is determined using EQUs 7-10 or EQUs 11-23. Control returns to control block 1202 and a next position and pseudorange are determined. Subsequent vehicle positions estimates are determined using the last four satellite positions and pseudoranges.

Figure 13:
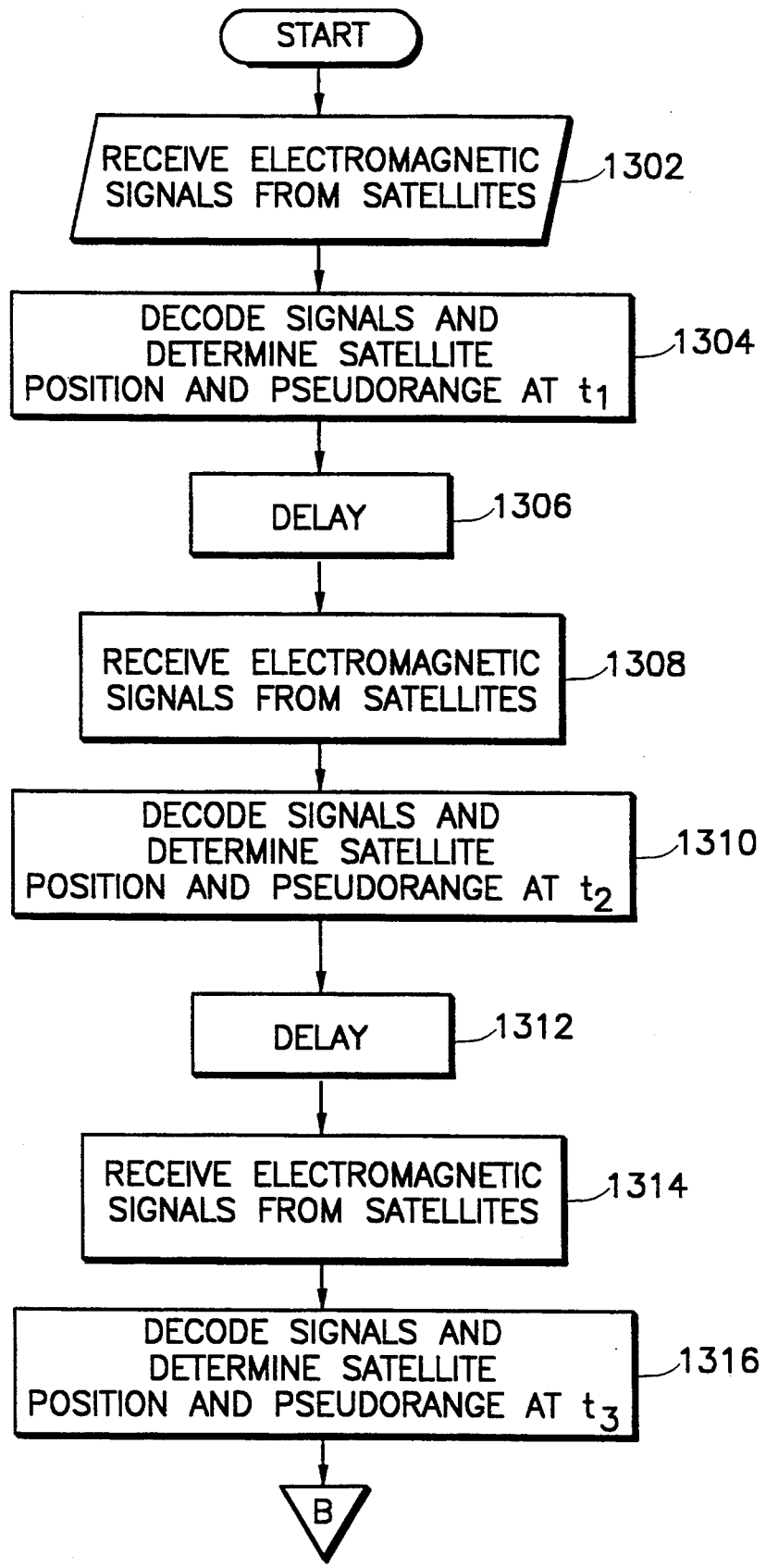
FIG. 13 is a first portion of a flow diagram of a control scheme for determining the position of a vehicle, according to an other embodiment of the present invention; and, FIG. 14 is a second portion of a control scheme for determining the position of a vehicle, according to the other embodiment of the present invention of FIG. 13.

With reference to FIG. 13, a method for determining the position of a vehicle 200, according to another embodiment of the present invention is described. In control block 1302, the electromagnetic signals from a single satellite $SV_5$ are received. In control block 1304, the signals are decoded. From the decoded information, the satellite's position, the first position, and the pseudorange corresponding to the first position at a first time, $t_1$, are determined.

In control block 1306, control is delayed for a predetermined period of time. Then in control blocks 1308 and 1310, the process is repeated to obtain a second position of the satellite, $SV'_5$, and second pseudorange at a second time, $t_2$.

In control block 1312, control is delayed for a predetermined period of time. Then in control blocks 1314 and 1316, a third position of the satellite and a third pseudorange at a third time, $t_3$, are determined using decoded signals.

Figure 14:
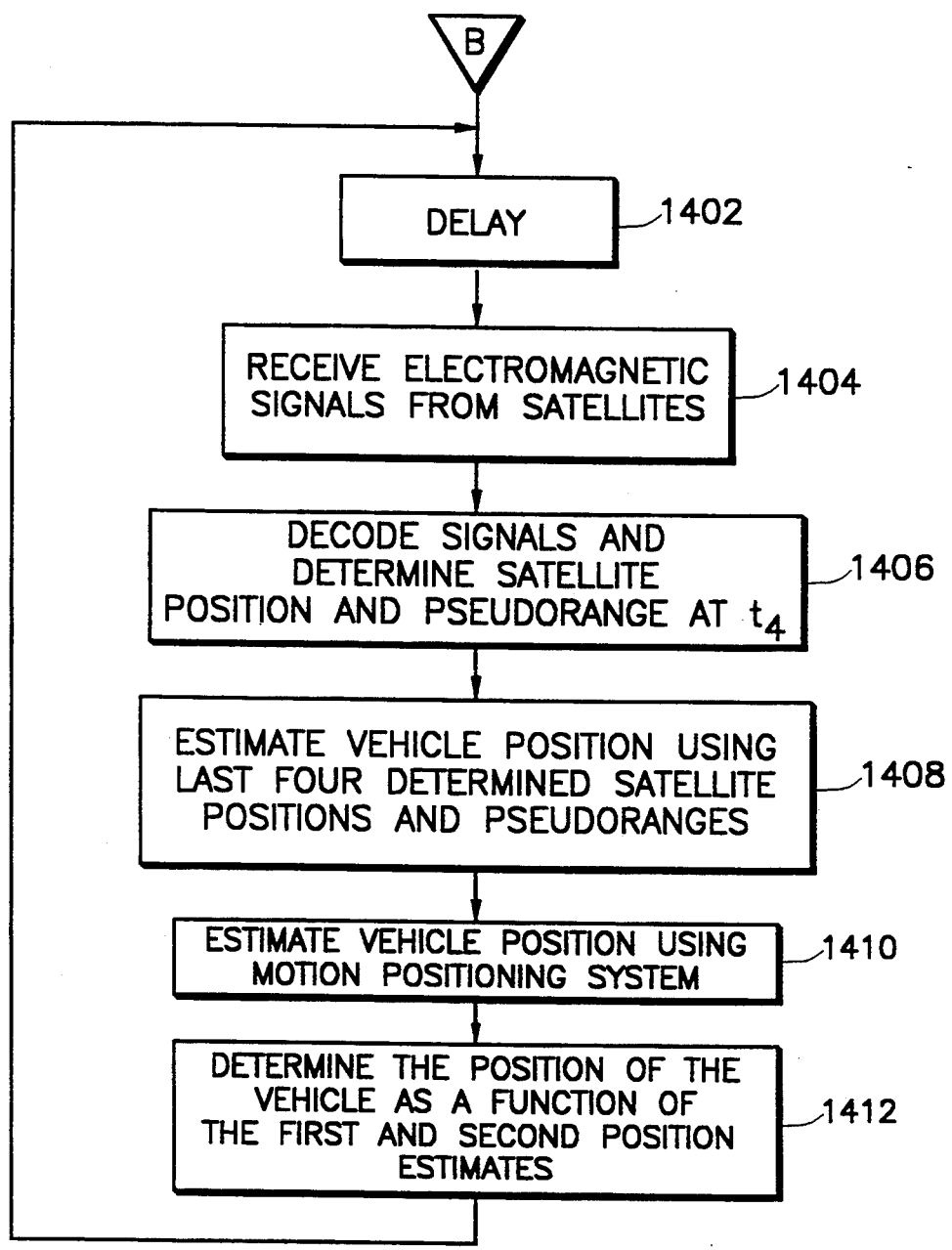

Referring to FIG. 14 in control block 1402 control is delayed for a predetermined period of time. Then in control blocks 1404 and 1406, a fourth position of the satellite and a fourth pseudorange at a fourth time, $t_4$, are determined using decoded signals.

Each subsequent position/pseudorange pair is separated from the prior pair by a predetermined sample time. In control block 1408, a first estimate of the vehicle's position is determined using triangulation methods. Each position/pseudorange pair is treated as an individual satellite and the position is determined using EQUs 7-10. Preferably, the first position estimate is adjusted for the vehicle's velocity as discussed above.

In control block 1410, a second estimate of the vehicle's position is determined using the MPS 212. In control block 1412, the vehicle's position is determined by combining the first and second position estimates. Control returns to control block 1402 and a next position is determined.

Industrial Applicability

With reference to the drawings and in operation, the present invention is adapted to provide a system and method for determining the position of a vehicle 200 using signals from a single satellite of a Global Positioning System. This is especially useful in rough terrain. In normal operation, the vehicle's position is determined from signals from at least four satellites. However, the terrain might include areas in which the signals are blocked by obstacles. Furthermore, there might be other situations where only one satellite is in view or where signals from only one satellite are being received, for example, during satellite or GPS receiver malfunction.

The present invention provides system and method for determining the position of a vehicle using signals from only one satellite. The most accurate position determination using this method is when the vehicle is stationary. However, the method may also be adapted to vehicles in motion by correcting for the vehicle's velocity as discussed above. The velocity may be determined by the IRU 218 or the phase shift of the electromagnetic signals transmitted by the satellite or a combination of both methods.

Satellite position, pseudorange, and vehicle velocity is typically measured at some small sample rate, for example every one half or one second. In one embodiment, vehicle position is determined using data from four consecutive sample periods. In another embodiment, vehicle position is determined using data from four larger time periods, for example, every hour. This method increases the resolution of position determination because the satellite position are much farther apart. However, the accuracy of the vehicle's velocity becomes much more important because the errors in velocity determinations are additive. To increase the velocity accuracy, the base station may be adapted to calculate velocity biases (see above).

Furthermore, the apparatus and method disclosed herein may be used when there are multiple and even more than four satellites visible. For example, the present invention can be used to determine the vehicle's position independently from a plurality of satellites. The independently determined positions may be averaged to calculate a more accurate position. Or the positions may be used to correct or adjust a position determination which is based on more than one satellite.

Furthermore, the present invention provides a position estimate which may be used as a basis to provide "limp-home" capabilities. Limp-home capability allows the vehicle to return to a repair facility, where repairs or service may be initiated.

Other aspect, objects, and features of the present invention can be obtained from a study of the drawings, the disclosure, and the appended claims.

We claim:

1. A system for estimating the terrestrial position of a vehicle using one of a plurality of orbiting satellites, comprising:
   means for receiving electromagnetic signals from the one satellite and responsively producing positions of the one satellite and corresponding ranges from said positions of the one satellite to the vehicle;
   means for receiving said positions and said corresponding ranges and responsively determining a first pair comprising a range and a corresponding satellite position at a first time, $t_1$, determining a second pair comprising a range and a corresponding satellite position at a second time, $t_2$, and determining a third pair comprising a range and a corresponding satellite position at a third time, $t_3$; and,
   means for receiving said first, second and third pairs and responsively determining the position of the vehicle.

2. A system, as set forth in claim 1, including means for determining a fourth pair comprising a range and a corresponding satellite position at a fourth time, $t_4$, and wherein said position determining means includes means for receiving said fourth pair and wherein the position of the vehicle is a function of said first, second, third, and fourth pairs.

3. A system, as set forth in claim 2, wherein the position of the vehicle corresponds to said fourth time, $t_4$, and wherein said position determining means includes means for determining the velocity of the vehicle at said first, second, and third times, $t_1$, $t_2$, $t_3$ and wherein the position of the vehicle is a function of said velocity at said first, second, and third times, $t_1$, $t_2$, $t_3$.

4. A system, as set forth in claim 1, wherein said first, second and third times are separated in time by a predetermined sample rate.

5. A system, as set forth in claim 1, wherein the positions of the one satellite are defined in Cartesian coordinates.

6. A system, as set forth in claim 3, including a base station at a known location, said base station including a reference receiver and adapted for determining velocity biases.

7. A system, as set forth in claim 6, wherein said velocity biases are communicated back to the vehicle.

8. A system for estimating the terrestrial position of a vehicle using one of a plurality of orbiting satellites, comprising:
   means for receiving electromagnetic signals from the one satellite and responsively producing positions of the one satellite and corresponding ranges from said positions of the one satellite to the vehicle;
   means for receiving said positions and said corresponding ranges and responsively determining a first pair comprising a range and a corresponding position at a first time, $t_1$, determining a second pair comprising a range and a corresponding position at a second time, $t_2$, and determining a third pair comprising a range and a corresponding position at a third time, $t_3$; and,
   means for receiving said first, second and third pairs and responsively determining a first position estimate of the vehicle;
   means for producing a second position estimate, said second position estimate producing means including an odometer and an inertial reference unit; and,
   means for receiving said first and second position estimates and responsively producing a third position estimate.

9. A system, as set forth in claim 8, wherein said first position estimate producing means includes a Kalman filter.

10. A system, as set forth in claim 8, wherein said third position estimate producing means includes a Kalman filter.

11. A system, as set forth in claim 8, wherein said third position estimate producing means includes a weighted combiner.

12. A system, as set forth in claim 8, wherein said third position estimate producing means includes a Kalman filter and a weighted combiner.

13. A system, as set forth in claim 8, including means for determining a fourth pair comprising a range and a corresponding satellite position at a fourth time, $t_4$ and wherein said position determining means includes means for receiving said fourth pair and wherein the position of the vehicle is a function of said first, second, third, and fourth pairs.

14. A system, as set forth in claim 13, wherein the position of the vehicle corresponds to said fourth time, $t_4$, and wherein said position determining means includes means for determining the velocity of the vehicle at said first, second, and third times, $t_1$, $t_2$, $t_3$ and wherein the position of the vehicle is a function of said velocity at said first, second and third times, $t_1$, $t_2$, $t_3$.

15. A system, as set forth in claim 14, including a base station at a known location, said base station including a reference receiver and adapted for determining velocity biases.

16. A system for estimating the terrestrial position of a vehicle using one of a plurality of orbiting satellites, comprising:

means for receiving electromagnetic signals from the one satellite and responsively producing a first position estimate;

means for producing a second position estimate, said second position estimate producing means including an odometer and an inertial reference unit; and, means for receiving said first and second position estimates and responsively producing a third position estimate; and wherein said first position estimate producing means includes:

an antenna for receiving said electromagnetic signals;

a receiver coupled to said antenna and being adapted to produce positions of the one satellite and corresponding ranges from said positions of the one satellite to the vehicle; and, a processor adapted to receive said positions and said corresponding ranges and responsively determine a first pair comprising a range and a corresponding position at a first time, $t_1$, determine a second pair comprising a range and a corresponding position at a second time, $t_2$, and determine a third pair comprising a range and a corresponding position at a third time, $t_3$ and including means for determining said first position estimate as a function of said first, second and third pairs.

17. A system, as set forth in claim 16, including means for determining a fourth pair comprising a range and a corresponding satellite position at a fourth time, $t_4$ and wherein said position determining means includes means for receiving said fourth pair and wherein the position of the vehicle is a function of said first, second, third, and fourth pairs.

18. A system, as set forth in claim 17, wherein said position of the vehicle corresponds to said fourth time, $t_4$, and wherein said position determining means includes means for determining the velocity of the vehicle at said first, second, and third times, $t_1$, $t_2$, $t_3$ and wherein the position of the vehicle is a function of said velocity at said first, second, and third times, $t_1$, $t_2$, $t_3$.

19. A method for estimating the position of a vehicle using one of a plurality of orbiting satellites, including:

receiving electromagnetic signals from the one satellite and responsively producing positions of the one satellite and corresponding ranges from said positions of the one satellite to the vehicle;

receiving said positions and said corresponding ranges and responsively determining a first pair comprising a range and a corresponding position at a first time, $t_1$;

receiving said positions and said corresponding ranges and responsively determining a second pair comprising a range and a corresponding position at a second time, $t_2$;

receiving said positions and said corresponding ranges and responsively determining a third pair comprising a range and a corresponding position at a third time, $t_3$; and, receiving said first, second and third pairs and responsively determining a position estimate of the vehicle.

20. A method, as set forth in claim 19, including the step of:

receiving said positions and said corresponding ranges and responsively determining a fourth pair comprising a range and a corresponding position at a fourth time, $t_4$; wherein said positioning determining step includes the step of:

receiving the fourth pair;

and wherein the position of the vehicle is determined as a function of the fourth pair.

21. A method, as set forth in claim 20, including the steps of:

determining the velocity of the vehicle at said first time, $t_1$;

determining the velocity of the vehicle at said second time, $t_2$;

determining the velocity of the vehicle at said third time, $t_3$;

and wherein the position of the vehicle is determined as a function of the vehicle's velocity at said first, second, and third times, $t_1$, $t_2$, $t_3$.

22. A method for estimating the position of a vehicle using one of a plurality of orbiting satellites, including:

receiving electromagnetic signals from the one satellite and responsively producing positions of the one satellite and corresponding ranges from said positions of the one satellite to the vehicle;

receiving said positions and said corresponding ranges and responsively determining a first pair comprising a range and a corresponding position at a first time, $t_1$;

receiving said positions and said corresponding ranges and responsively determining a second pair comprising a range and a corresponding position at a second time, $t_2$;

receiving said positions and said corresponding ranges and responsively determining a third pair comprising a range and a corresponding position at a third time, $t_3$; and, receiving said first, second and third pairs and responsively determining a first position estimate of the vehicle.

receiving signals from an odometer and an inertial reference unit and responsively producing a second position estimate; and, receiving said first and second position estimate and responsively producing a third position estimate.

* * * * *